United States Patent
Ericson (10) Patent No.: US 7,970,119 B2
(45) Date of Patent: Jun. 28, 2011

(54) RING TONE VISUALIZER

(75) Inventor: Anders Ericson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1208 days.

(21) Appl. No.: 11/616,094

(22) Filed: Dec. 26, 2006

(65) Prior Publication Data

US 2008/0152124 A1    Jun. 26, 2008

(51) Int. Cl.
    *H04M 1/02* (2006.01)
(52) U.S. Cl. ............... 379/373.02; 84/603; 379/376.01; 455/23; 455/566
(58) Field of Classification Search ............ 84/477, 84/603; 379/93.03, 142.01, 201.12, 207.16, 379/373.02, 375.1, 376.01; 385/147; 455/415, 455/566, 567, 3.01, 575.1, 23; 725/62; 345/473; 348/14.01; 358/1.15; 715/781
    See application file for complete search history.

(56) References Cited

U.S. PATENT DOCUMENTS

| | | | |
|---|---|---|---|
| 6,990,361 B2 * | 1/2006 | Lutche et al. | 455/567 |
| 7,209,153 B2 * | 4/2007 | Lehman | 345/473 |
| 7,280,647 B2 * | 10/2007 | Henderson | 379/142.01 |
| 7,366,295 B2 * | 4/2008 | Patton | 379/375.01 |
| 7,442,868 B2 * | 10/2008 | Park et al. | 84/603 |
| 7,599,719 B2 * | 10/2009 | Patton | 455/575.1 |
| 7,856,205 B2 * | 12/2010 | Bylsma | 455/23 |
| 2003/0083110 A1 * | 5/2003 | Lutche et al. | 455/567 |
| 2004/0139842 A1 * | 7/2004 | Brenner et al. | 84/477 R |
| 2005/0049005 A1 | 3/2005 | Young et al. | |
| 2005/0070241 A1 | 3/2005 | Northcutt et al. | |
| 2005/0196127 A1 * | 9/2005 | Cole et al. | 385/147 |
| 2005/0265532 A1 * | 12/2005 | Trinkel et al. | 379/201.12 |
| 2006/0152678 A1 | 7/2006 | Hung et al. | |
| 2006/0184893 A1 * | 8/2006 | Chow et al. | 715/781 |
| 2006/0274144 A1 * | 12/2006 | Landschaft et al. | 348/14.01 |
| 2007/0116212 A1 * | 5/2007 | Huang et al. | 379/93.03 |
| 2007/0245384 A1 * | 10/2007 | Walter et al. | 725/62 |
| 2008/0026690 A1 * | 1/2008 | Foxenland | 455/3.06 |
| 2008/0152124 A1 * | 6/2008 | Ericson | 379/373.02 |
| 2009/0005023 A1 * | 1/2009 | Toorn | 455/415 |
| 2009/0067605 A1 * | 3/2009 | Holm et al. | 379/207.16 |
| 2010/0046030 A1 * | 2/2010 | Silverbrook et al. | 358/1.15 |

FOREIGN PATENT DOCUMENTS

| | | | |
|---|---|---|---|
| DE | 103 51 817 A1 | 5/2005 | |
| WO | WO 2007/096692 A1 | 8/2007 | |

OTHER PUBLICATIONS

International Search Report with Written Opinion in PCT Application No. PCT/IB2007/052459, dated Feb. 29, 2008, 15 pages.

* cited by examiner

*Primary Examiner* — Gerald Gauthier
(74) *Attorney, Agent, or Firm* — Snyder, Clark, Lesch & Chung, LLP (57) ABSTRACT

A device may retrieve a ring tone, an image, and a visual effect from a database based on a client line identifier. In addition, the device may generate frequency samples based on the ring tone, may transform the image based on the frequency samples and the visual effect, and may display the transformed image.

21 Claims, 8 Drawing Sheets

Fig. 6D $$E_L/E_{MAX1} \cdot 360$$

Fig. 6E $$\frac{E_H + E_{MAX2}}{E_{MAX2}} \cdot 100$$

RING TONE VISUALIZER

TECHNICAL FIELD OF THE INVENTION

Implementations described herein are related to portable devices, and in particular, pertain to methods and apparatuses for displaying an image or images that change as a ring tone is played on a portable device.

DESCRIPTION OF RELATED ART

A portable device may allow a user to customize the phone in many ways. For example, the phone may allow the user to associate a particular ring tone with the identity of a party making an incoming call. Such customization, however, may be inadequate for some users that wish to further personalize their phones.

SUMMARY

According to one aspect, a method may comprise retrieving a ring tone, an image, and a visual effect from a database based on a client line identifier (CLI). The method may further comprise generating frequency samples based on the ring tone, transforming the image based on the frequency samples and the visual effect, and displaying the transformed image.

Additionally, the method may further comprise obtaining the CLI based on an incoming call.

Additionally, the method may further comprise retrieving the CLI based on a user selection.

Additionally, generating frequency samples may include generating sets of frequency samples of a power spectrum of the ring tone.

Additionally, generating sets of frequency samples may include generating each set of frequency samples at a predetermined time interval.

Additionally, generating frequency samples may include generating frequency samples based on the ring tone while the ring tone is being played.

Additionally, the method may further comprise associating a visual effect, an image, or a ring tone with a CLI.

Additionally, transforming the retrieved image may include swirling the image based on the frequency samples and the visual effect.

Additionally, transforming the retrieved image may include creating an image based on the frequency samples and the visual effect independently of the retrieved image.

According to another aspect, a device may comprise a display screen. The device may further comprise a processor to obtain an audio recording and a visual effect from a database based on an identity of a party making an incoming call, to determine frequency information associated with the audio recording, to generate an image based on the frequency information and the visual effect, and to display the generated image on the display screen.

Additionally, the database may include an association between the audio recording and the visual effect.

Additionally, the database may include one or more visual effects and metadata associated with the visual effects.

Additionally, the database may include a visual effect that generates images of sinusoidal waves.

Additionally, the processor may be configured to retrieve an image from the database, and modify the retrieved image based on the frequency information.

Additionally, the database may include a visual effect for swirling an image.

According to a further aspect, a device may comprise means for locating a ring tone, an image, and a visual effect from a database based on a client line identifier (CLI), means for outputting frequency samples from the ring tone, means for generating an image using the frequency samples and the visual effect, and means for displaying the generated image on a display screen.

Additionally, the database may include a visual effect for swirling an image.

Additionally, the device may further comprise means for associating a visual effect, an image, or a ring tone with a CLI.

Additionally, the device may further comprise means for receiving a call; and means for determining a CLI based on the call.

According to yet another aspect, a method may comprise receiving a call. The method may further comprise identifying a ring tone, an image, and a visual effect based on the call. Additionally, the method may comprise playing the ring tone to announce the call and displaying the image while the ring tone is playing. The method may further comprise modifying the image, using the visual effect, in sync with the playing of the ring tone.

Additionally, the method may further comprise producing a client line identifier based on the call.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. In addition, the term "ring tone" or "ringtone," as used herein, refers to a digital audio recording, played by a device to indicate an incoming call.

Examplary Device

A communication device may allow a user to customize the device. In the following implementations, the user may customize the device by associating a ring tone, an image and/or a visual effect with a party from which an incoming call is received. Upon receiving a call from the party, the device may play the ring tone and display the image on its screen. While the ring tone is being played, frequency information in the ring tone may be periodically extracted and used as inputs to apply the visual effect.

Figure 1:
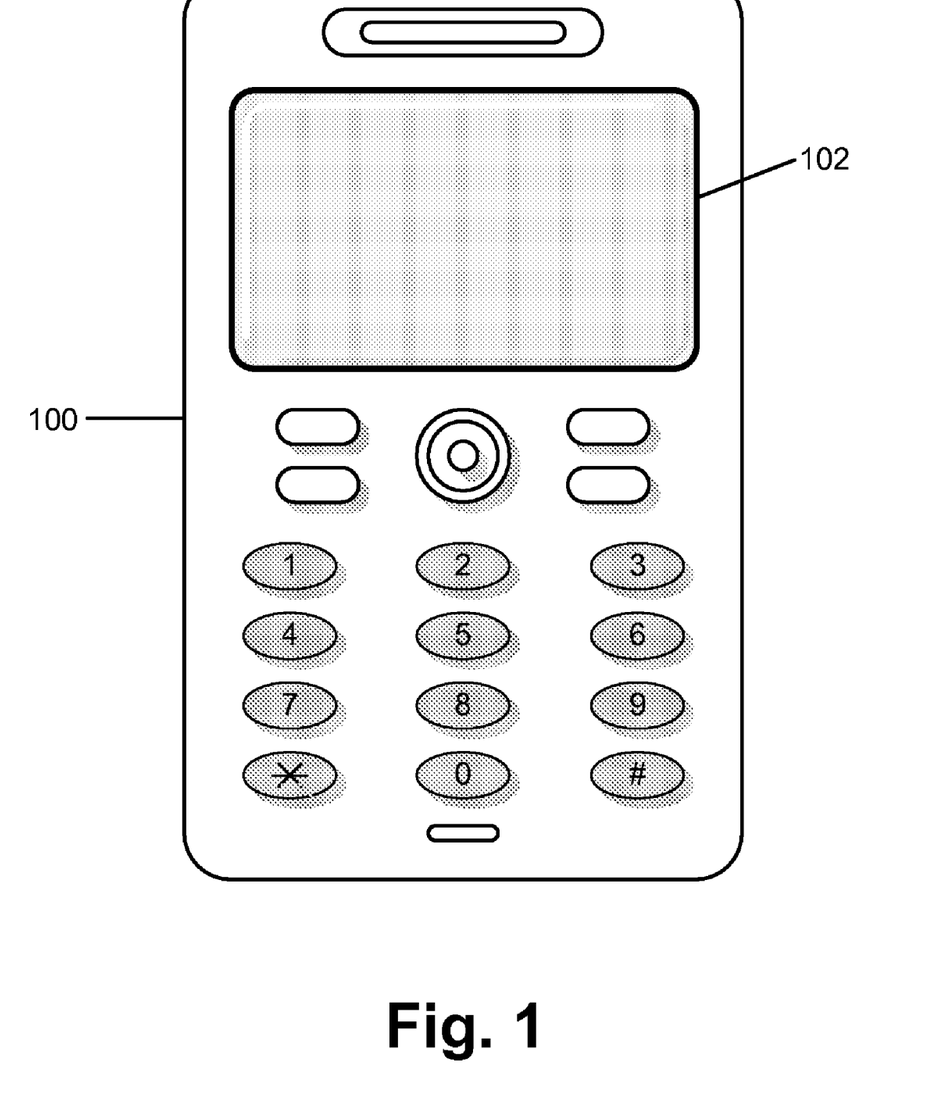
FIG. 1 depicts an exemplary device in which systems and methods described herein can be implemented.

FIG. 1 depicts an exemplary device in which systems and methods described herein can be implemented. Device 100 may include a communication device, such as any of the following devices that incorporate or are adapted to incorporate a display screen 102: a radio telephone; a personal communications system (PCS) terminal that may combine cellular radiotelephone with data processing, facsimile, and data communications capabilities; a mobile telephone; an electronic notepad; a laptop; a personal computer (PC); a personal digital assistant (PDA) that can include a radiotelephone, pager, Internet/intranet access, web browser, organizer, calendar, and/or Global Positioning System (GPS) receiver; a landline telephone; or any device with sufficient computing power and memory to support functions described herein.

Figure 2:
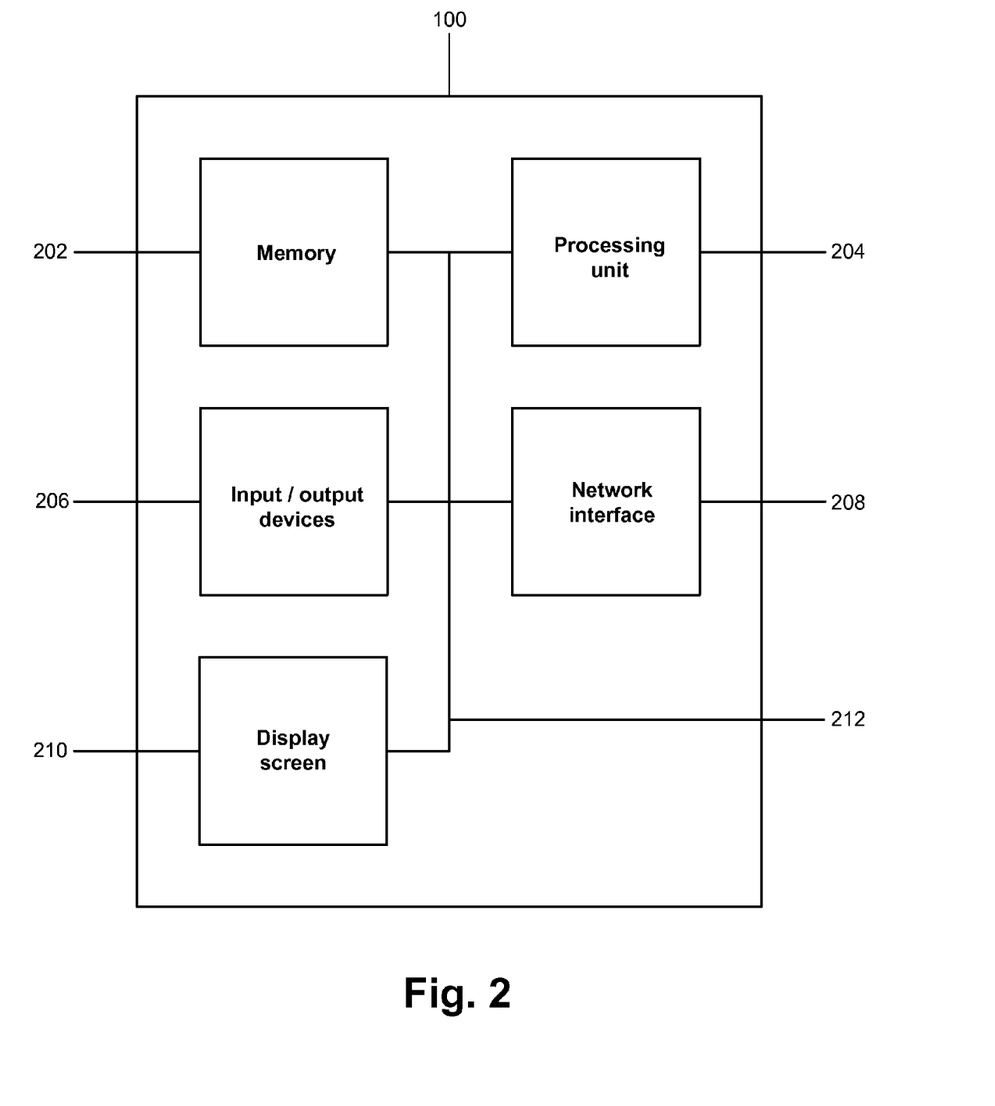
FIG. 2 shows a block diagram of the exemplary device of FIG. 1.

FIG. 2 shows a block diagram of exemplary device 100. Device 100 may include memory 202, processing unit 204, input/output devices 206, network interface 208, display screen 210, and communication bus 212. Memory 202 may include static memory, such as read only memory (ROM), and/or dynamic memory, such as random access memory (RAM), for storing data and machine-readable instructions. Memory 202 may also include storage devices, such as a floppy disk, CD ROM, CD read/write (R/W) disc, and/or flash memory, as well as other types of storage devices.

Processing unit 204 may include one or more processors, microprocessors, and/or processing logic capable of controlling device 100. Input/output devices 206 may include a keyboard, mouse, speaker, microphone, digital camera, digital video camera, and/or other types of devices for converting physical events or phenomena to and/or from digital signals that pertain to device 100.

Network interface 208 may include any transceiver-like mechanism that enables device 100 to communicate with other devices and/or systems. For example, communication interface 208 may include mechanisms for communicating via a network, such as the Internet, a terrestrial wireless network, a satellite-based network, etc. Additionally or alternatively, network interface 208 may include a modem, an Ethernet interface to a LAN, and/or an interface/connection for connecting device 100 to other devices.

Display screen 210 may include a device that can display signals generated by device 100 as images on a screen. Examples of a display screen include a liquid crystal display (LCD) screen, cathode ray tube (CRT) display screen, organic light-emitting diode (OLED) display screen, surface-conduction electron-emitter display (SED) screen, plasma display screen, field emission display (FED) screen, and bistable display screen. In practice, device 100 may include one or more display screens.

Communication bus 212 may provide an interface through which components of device 100 can communicate with one another.

Figure 3:
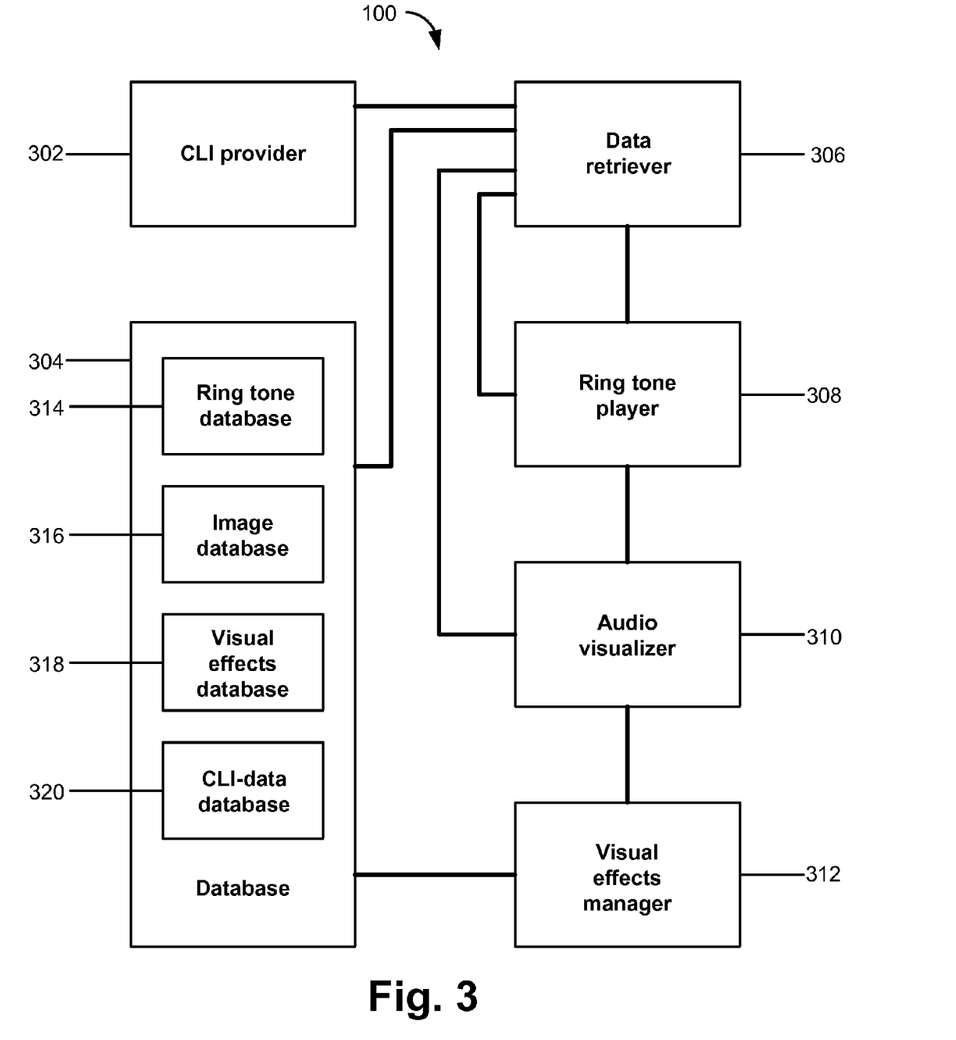
FIG. 3 illustrates a functional block diagram of exemplary components that are either included in or implemented by the device of FIG. 1.

FIG. 3 illustrates a functional block diagram of exemplary components that are either included in or implemented by device 100. The components may be in hardware and/or in software, and may include Client Line Identifier (CLI) provider 302, database 304, data retriever 306, ring tone player 308, audio visualizer 310, and/or visual effects manager 312.

CLI provider 302 may include a device or program for obtaining a CLI based on an incoming call. Briefly, the term "Client Line Identifier" (CLI), as used herein, may refer to a string or a sequence of characters that uniquely identifies the party that is making the incoming call (e.g., phone number). CLI provider 302 may provide other components in FIG. 3 with CLIs.

Database 304 may include records, tables, ordered lists, linked lists, files and/or organized data structures that may be searched and modified. Database 304 may act as an information repository of ring tones, images, visual effects, and/or a set of associations between ring tones, images, and CLIs.

More specifically, database 304 may include ring tone database 314, image database 316, visual effects database 318, and CLI-data database 320. Ring tone database 314 may include digital audio recordings that are played by device 100 to indicate an incoming call and metadata (e.g., ring tone name) that are associated with the digital audio recordings. Image database 316 may include images that may be shown on display screen 210 of device 100 and metadata (e.g., image name, image size) that are associated with the pictures or images. The term "image," as used herein, may refer to a picture, a graphics image, a video, or any visual information that can be displayed. Visual effects database 318 may include programs or sets of data, herein referred to as "visual effects," that can be used to generate an image or to modify an image when a ring tone is played. In addition, visual effects database 318 may include metadata (e.g., description of visual effects) that are associated with the visual effects.

Examples of a visual effect include a process that modifies an image by rotating and/or magnifying it; a process that swirls an image by holding the edges of the image in place and turning image elements within the edges around a fixed point; a process that generates images of sinusoidal waves; a process that changes the color of an image; a process that shakes an image; and a process that combines a number of the aforementioned visual effects or provides other effects.

CLI-data database 320 may include CLIs, metadata about CLIs (e.g., caller name) and one or more pieces of information, each of which associates a CLI with a ring tone, an image, and/or a visual effect. CLI-data database 320 may be searched, using as a key the CLI that identifies a calling party, to obtain references to a ring tone, an image and/or a visual effect. The references, in turn, may be used to retrieve the ring tone, which may be played by device 100 to indicate the incoming call, to retrieve the image, which may be displayed by device 100, and to retrieve the visual effect. Within CLI-data database 320, a CLI that is associated with one type of data (e.g., ring tone) may not necessarily be associated with other types of data (e.g., image or visual effect). Conversely, it is possible that a CLI is associated with a ring tone, an image, and a visual effect.

While FIG. 3 shows database 304 as having ring tone database 314, image database 316, visual effects database 318, and CLI-data database 320, it is possible to implement database 304 that includes all information in ring tone database 314, image database 316, visual effects database 318, and CLI-data database 320 as a single table. Given a CLI as a key, the table may be searched for a ring tone, an image, and a visual effect.

Data retriever 306 may include software and/or hardware for receiving a CLI from CLI provider 302 and for retrieving a ring tone, an image, and/or a visual effect from database 304, using the CLI as a key. Data retriever 306 may provide other components in FIG. 3 with the ring tone, image, and/or visual effect. If data retriever 306 fails to locate a ring tone, an image, and/or a visual effect for a given CLI, data retriever may 306 return a default ring tone, image (e.g., an image of caller name and phone number) and/or visual effect.

Ring tone player 308 may include software and/or hardware for accepting a ring tone as an input, for playing the ring tone, and generating an audio signal and sets of frequency samples from the ring tone. Depending on implementations, a set of frequency samples may represent a characteristic of the audio signal within a sampling time window of a preset duration. For example, in one implementation, the samples may represent a Discrete Fourier Transform of the audio signal. In another implementation, the samples may represent the power spectrum of the audio signal in the DFT frequency domain.

Audio visualizer 310 may include hardware and/or software for accepting as inputs an image and a visual effect from data retriever 306 and sets of frequency samples from ring tone player 308. When a ring tone is played, audio visualizer 310 may use each set of the frequency samples from ring tone player 308 in applying the visual effect to the image. The application of the visual effect may generate an image or images that may be shown on display screen 210.

Visual effects manager 312 may include hardware and/or software for accepting user inputs for managing visual effects. For instance, when a user interacts with visual effects manager 312, visual effects manager 312 may associate a CLI with a ring tone, an image, and/or a visual effect. When visual effects manager 312 makes an association, the association may be inserted into CLI-data database 320. In addition, visual effects manager 312 may retrieve, on behalf of the user and through the use of data retriever 306, CLIs in CLI-data database 320, ring tones in ring tone database 314, images in image database 316, and/or visual effects in visual effects database 318. Furthermore, on behalf of the user, visual effects manager 312 may download and/or transmit ring tones, images, and/or visual effects to and from other devices 100.

In an alternative implementation, visual effects manager 312 may associate more than one visual effect and/or image with a particular CLI. When separate calls are received in sequence from the same party, different visual effects may be alternately applied.

Exemplary Process for Visualizing Ring Tone

Figure 4A:
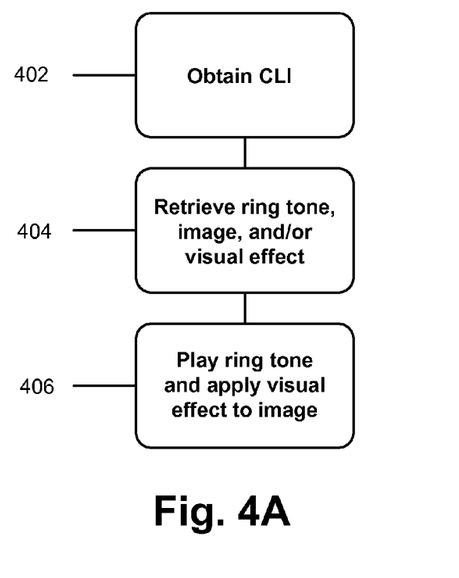
FIG. 4A shows an exemplary process for visualizing a ring tone.

FIG. 4A shows an exemplary process for visualizing a ring tone. At block 402, a CLI may be obtained. Obtaining the CLI may be triggered by various events, such as an incoming call or a request from visual effects manager 312. At block 404, the CLI may be used as a key to database 304 for retrieving a ring tone, an image, and/or a visual effect.

More specifically, when database 304 is searched with a CLI, CLI-data database 320 may provide the references to a ring tone, an image, and/or a visual effect that are associated with the CLI. Once the references are acquired from CLI-data database 320, they may be used to retrieve the ring tone, the image, and/or the visual effect from ring tone database 314, image database 316, and/or visual effects database 318, respectively. If there is no user-defined association between the CLI and a ring tone, an image and/or a visual effect, a default ring tone, image and/or visual effect may be retrieved. The retrieved ring tone may be conveyed to ring tone player 308 and the retrieved image and/or visual effect may be conveyed to audio visualizer 310.

Figure 4B:
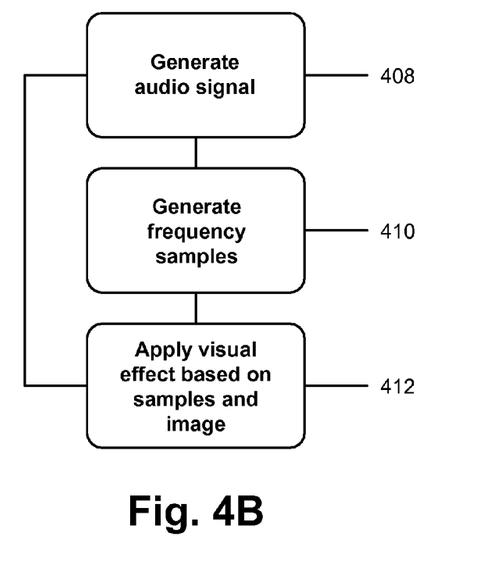
FIG. 4B shows an exemplary process for playing a ring tone and applying a visual effect.

At block 406, the ring tone may be played and the visual effect may be applied. FIG. 4B shows an exemplary process for playing the ring tone and applying the visual effect.

As shown at block 408, playing the ring tone may include generating an audio signal. The audio signal may be used to drive a number of input/output devices 206, such as one or more speakers or earphones. At block 410, sets of frequency samples may be generated at predetermined time intervals. The time window for which a set of frequency samples are generated may be contiguous with preceding and succeeding time windows. In addition, the duration of each time window may be equivalent to the time interval. A set of frequency samples may represent, depending on implementation, frequency characteristics of the audio signal within a time window. For instance, a set of frequency samples may represent a Discrete Fourier Transform (DFT) of the audio signal.

At block 412, the retrieved visual effect may be applied. Applying the visual effect may include generating and displaying images based on the sets of frequency samples and/or based on the image retrieved at block 404. To generate the images, the frequency samples may be digitally processed to derive a set of values, which are used as inputs to an image transformation process that is applied to the retrieved image. If the visual effect generates its own images, as in the case where the visual effect produces a time-varying graph of sine waves, the retrieved image may not be used in applying the transformation process. The specifics of a transformation process may depend on the particular visual effect that is associated with and retrieved using the CLI. The transformed images may be generated and displayed while the ring tone is played.

Figure 5:
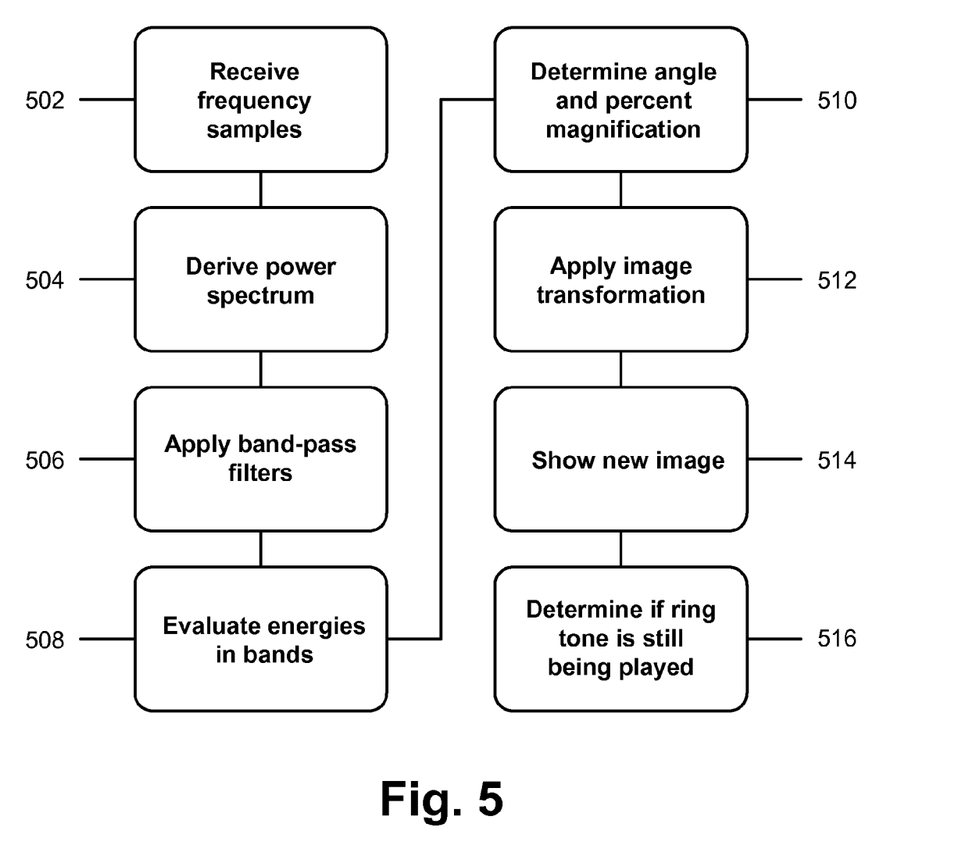
FIG. 5 illustrates a flowchart of an exemplary visual effect and its image transformation process.

FIG. 5 illustrates a flowchart of an exemplary visual effect and its image transformation process, which are described with further reference to FIGS. 6A-6F. In the exemplary visual effect, the transformation process includes a rotation and a magnification of a retrieved image. In addition, a set of values that are used as inputs to the transformation process may include the angle of rotation and the size of magnification, and they may be determined based on high frequency and low frequency energies in frequency samples that are received from ring tone player 308.

Figure 6A:
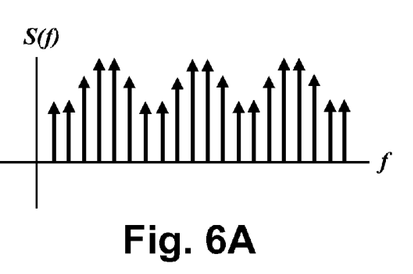
FIG. 6A shows a set of frequency samples from the ring tone player of FIG. 3.

As shown at block 502, a set of frequency samples are received from ring tone player 308. FIG. 6A shows the set of frequency samples. The samples are depicted as being in the DFT frequency domain. Repeating portions of the frequency samples and those in the negative part the frequency domain are not shown.

Figure 6B:
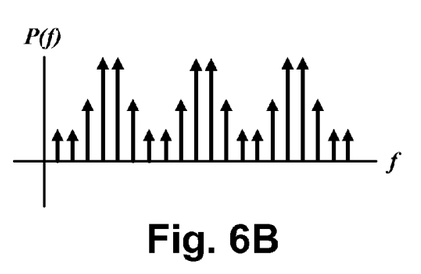
FIG. 6B shows a power spectrum that is derived from the samples in FIG. 6A.
Figure 6C:
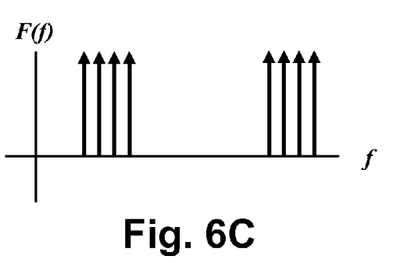
FIG. 6C shows the upper and lower bands of two band-pass filters.
Figure 6D:
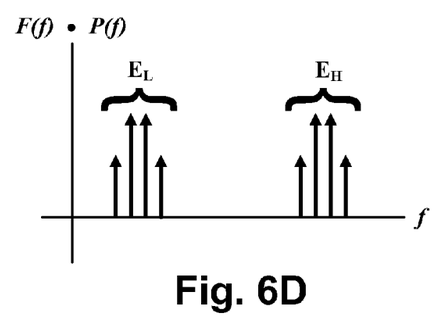
FIG. 6D shows the result of applying the band-pass filters of FIG. 6C to the power spectrum of FIG. 6B.

At block 504, a power spectrum may be derived from the samples. FIG. 6B shows the power spectrum that is derived from the samples in FIG. 6A. At block 506, two band-pass filters may be applied to the power spectrum. FIG. 6C shows the upper and lower bands of the two band-pass filters, and FIG. 6D shows the result of applying the band-pass filters to the power spectrum.

At block 508, the energy in each band may be evaluated, by adding up the magnitudes of the samples in each band. The energy contained in the lower band, indicated as $E_L$ in FIG. 6D, may be used to determine the angle by which the retrieved image may be rotated, and the energy contained in the higher band, indicated as $E_H$ in FIG. 6D, may be used to determine a percentage of magnification that may be applied to the image.

Figure 6E:
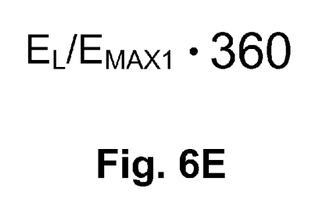
FIG. 6E shows an exemplary formula for deriving a degree of rotation for transforming an image.

At block 510, the angle of rotation and the percentage of magnification may be determined. FIG. 6E shows an exemplary formula for deriving the degree of rotation from $E_L$. The rotation in degrees may be computed by first normalizing $E_L$ to some constant $E_{MAX1}$, such that $E_L/E_{MAX1}$ is less than one, and then by multiplying $E_L/E_{MAX1}$ by 360. The value of $E_{MAX1}$ may be determined in many different ways, and in one implementation, it may be determined by, during the implementation of the exemplary visual effect, calculating the maximum spectral energy that may be present in the lower frequency band for a number of ring tones.

Figure 6F:
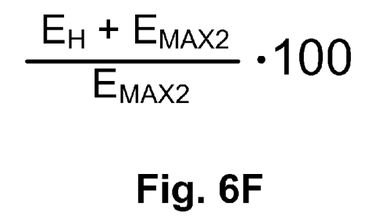
FIG. 6F shows an exemplary formula for deriving a percentage of magnification for transforming an image.

FIG. 6F shows an exemplary formula for deriving the percentage of magnification based on $E_H$. The percentage of magnification may be determined by first normalizing $E_H$ to some constant $E_{MAX2}$, such that $(E_{MAX2}+E_H)/E_{MAX2}$ is between 1 and 2. The value of $E_{MAX2}$ may be determined in ways similar to those for $E_{MAX1}$.

Figure 7A:
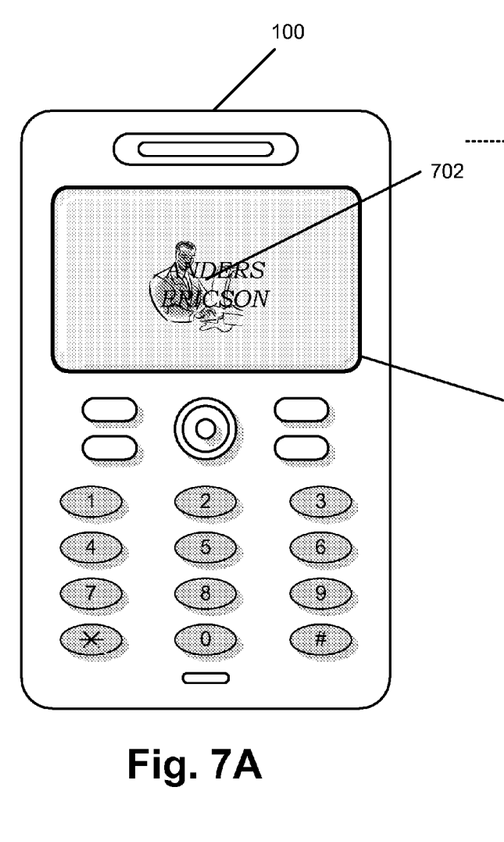
FIG. 7A illustrates an exemplary image in the image database of FIG. 3.
Figure 7B:
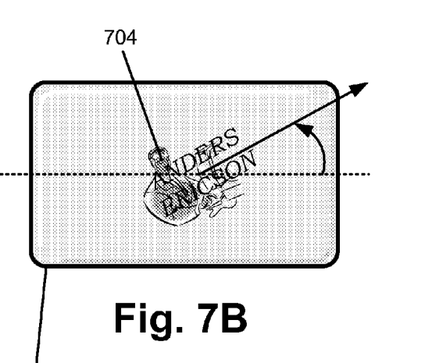
FIG. 7B illustrates an image that is derived from the exemplary image in FIG. 7A by rotating the image.

At block 512, the angle of rotation and the percentage of magnification may be used as inputs to the image transformation process that may be applied to the retrieved image. FIG. 7A shows an exemplary image 702 prior to the transformation. FIG. 7B shows an image 704 that is derived from the image 702 in FIG. 7A by rotating it in accordance with the formula in FIG. 6E. While a ring tone is being played, and if the audio signal shifts to lower tones, energy $E_L$ in lower frequencies becomes larger. Therefore, the image may rotate in accordance with the ring tone.

Figure 7C:
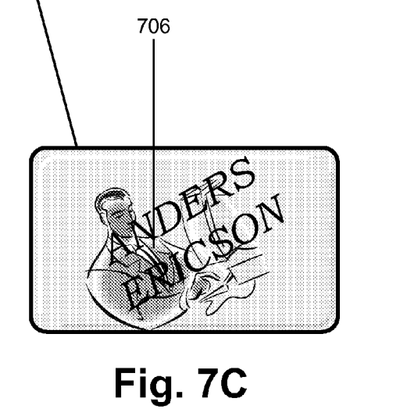
FIG. 7C illustrates an image that is derived by magnifying the image in FIG. 7B.

FIG. 7C shows an image 706 that is derived from image 704 in FIG. 7B by magnifying it in accordance with the formula in FIG. 6F. While a ring tone is played, and if the audio signal shifts to higher tones, energy $E_H$ in higher frequencies becomes larger. Therefore, the image may be magnified in accordance with the ring tone.

Returning to FIG. 5, at block 514, the new image that is derived by rotating and magnifying the original image may be shown on display screen 210. At block 516, whether the ring tone is still being played is determined. If the ring tone is not being played, the visual effect may terminate. Otherwise, the visual effect may begin anew at block 502.

Figure 8:
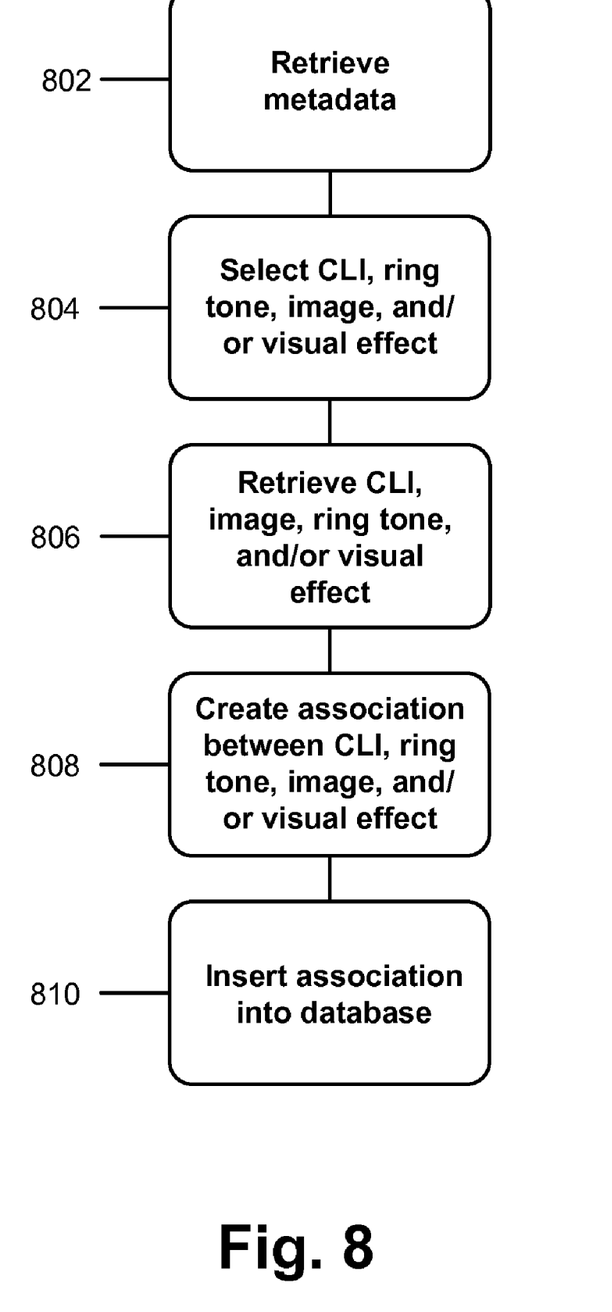
FIG. 8 illustrates an exemplary process for managing visual effects.

Exemplary Processes for Managing a Ring Tone, an Image, and/or a Visual Effect In the above embodiment, a user may have the ability to manage visual effects and the associations between visual effects and CLIs, ring tones, and/or images. FIG. 8 illustrates an exemplary process for managing the visual effects and the associations.

At block 802, metadata associated with CLIs, ring tones, images, and/or visual effects, may be retrieved and presented on display screen 102, so that a user may select, at block 804, a CLI, a ring tone, an image, and/or a visual effect. At block 806, the selected CLI, ring tone, image, and/or visual effects is/are retrieved. At blocks 808 and 810, an association between CLI, ring tone, image and/or visual effect may be created and inserted into CLI-data database 320, respectively. For example, an association between a phone number, the visual effect illustrated in FIG. 5, and image 702 may be created and inserted into CLI-data database 320.

Alternative Implementation

In an alternative implementation, hardware/software components in FIG. 3 (i.e., database 304, data retriever 306, ring tone player 308, and audio visualizer 310) may be configured so that data other than images, ring tones, and visual effects are passed to and from the components.

Referring back to FIG. 3, visual effects database 318 may be modified to include a number of parameters as well as programs and data for applying a visual effect to an image. Examples of parameters include: the number of frequency samples that are expected from ring tone player 308 by a particular visual effect each time the samples are conveyed from ring tone player 308 to audio visualizer 310; and the duration of a sampling interval over which the frequency samples are generated.

Data retriever 306, when it retrieves a visual effect for audio visualizer 310, may also retrieve the parameters and convey them to ring tone player 308. Upon receiving the parameters and the ring tone, ring tone player 308 may periodically supply audio visualizer 310 with the specified number of frequency samples at the specified sampling intervals.

In yet another implementation, audio visualizer 310 may be modified so that when it receives a visual effect from data retriever 306, it passes a number of parameters to ring tone player 308. The parameters may specify: the number of frequency samples that are expected from ring tone player 308 by a particular visual effect each time the samples are conveyed from ring tone player 308 to audio visualizer 310; and the duration of a sampling interval over which the frequency samples are generated.

Example

The following example illustrates processes involved in using a ring tone visualizer, with references to FIGS. 3, 6B-6F, and 7A-7C. In the figures that illustrate signals in the DFT frequency domain, only non-repeating portions of the signals in the non-negative part of the domain are shown.

Assume that a user, Anders, powers up phone 100 that is shown in FIG. 7A. After powering up, Anders receives a call from Birgitta. With the arrival of the call, phone 100 obtains the CLI that is associated with Birgitta, and using the CLI, retrieves a ring tone, which is a snippet of "Aldrig Mer," by Patrik Isaksson, from database 304. In addition, it retrieves image 702 and a visual effect. The ring tone is conveyed to ring tone player 308, and image 702 and the visual effect are conveyed to audio visualizer 310.

Given the ring tone, ring tone player 308 generates an acoustic signal and frequency samples. The acoustic signal is used to drive a speaker, and the frequency samples are provided to audio visualizer 310.

In this example, it is assumed that the samples represent the power spectrum of the acoustic signal and that they are as shown in FIG. 6B. Based on the samples, energies in a low frequency band and a high frequency band are determined by filtering the samples with band pass filters that are shown in FIG. 6C and by adding up the magnitudes of the filtered samples in each band. The energies are used to determine the angle of rotation and the percentage of magnification in accordance with the formulas in FIGS. 6E and 6F. Image 702 is transformed by rotating it by the computed angle and by magnifying by the computed percentage of magnification. Transformed image 706 is shown on its display screen.

While the ring tone is being played, additional frequency samples are received from ring tone player and, thus, image 702 rotates, expands and contracts with the ring tone.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 4A, 4B, 5, and 8, the order of the blocks may be modified in other implementations. For example, block 506 may be performed before block 504. In addition, non-dependent blocks, such as blocks 408 and 410, may represent acts that can be performed in parallel. Further, certain non-dependent blocks, such as block 806, may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   retrieving a ring tone, an image, and a visual effect from a database based on a client line identifier (CLI);
   generating frequency samples based on the ring tone;
   transforming the retrieved image based on the frequency samples and the visual effect; and
   displaying the transformed image.

2. The method as in claim 1, further comprising:
   obtaining the CLI based on an incoming call.

3. The method as in claim 1, further comprising:
   retrieving the CLI based on a user selection.

4. The method as in claim 1, where generating frequency samples includes:
   generating sets of frequency samples of a power spectrum of the ring tone, and where the transforming includes:
   transforming the retrieved image based on the generated sets of frequency samples of the power spectrum of the ring tone and the visual effect.

5. The method as in claim 4, where generating sets of frequency samples includes:
   generating each set of frequency samples at a predetermined time interval.

6. The method as in claim 1, where generating frequency samples includes:
   generating frequency samples based on the ring tone while the ring tone is being played.

7. The method as in claim 1, further comprising:
   associating a second, different visual effect, a second, different image, or a second different ring tone with a second, different CLI;
   retrieving, using the second CLI, the second visual effect, the second image, and the second ring tone in response to an incoming call associated with the second CLI;
   generating, based on the second ringtone, high frequency information and low frequency information;
   rotating the retrieved second image using the low frequency information; and
   magnifying the retrieved second image using the high frequency information.

8. The method as in claim 1, where transforming the retrieved image includes:
   swirling the image based on the generated frequency samples and information, retrieved from the database based on the CLI, identifying the visual effect.

9. The method as in claim 1, further comprising:
   retrieving, using a second CLI, information identifying a second visual effect and a second ring tone in response to an incoming call associated with the second CLI;
   generating second frequency samples based on the second ring tone, the generated second frequency samples including at least one of high frequency samples or low frequency samples;
   creating a second, different image based on retrieved information identifying the second visual effect; and
   at least one of:
   rotating the created second image using the low frequency samples when the generated second frequency samples include the low frequency samples, or
   magnifying the created second image using the high frequency samples when the generated second frequency samples include the high frequency samples.

10. A device comprising:
    a display screen; and
    a processor to:
    obtain an audio recording and a visual effect from a database based on an identity of a party placing an incoming call;
    determine frequency information associated with the obtained audio recording, the determined frequency information including high frequency information and low frequency information;
    transform an image based on the determined frequency information and the obtained visual effect,
    where, when transforming the image, the processor is to:
    rotate the image using the low frequency information, and
    magnify the image using the high frequency information; and
    display the transformed image on the display screen.

11. The device as in claim 10, where the database includes:
    an association between the audio recording and the visual effect.

12. The device as in claim 10, where the database includes:
    one or more visual effects and metadata associated with the one or more visual effects.

13. The device as in claim 10, where the database includes:
    a second visual effect that generates images of sinusoidal waves, and
    where the processor is to:
    obtain the second visual effect and a second audio recording based on identification information associated with a second incoming call, generate the images of the sinusoidal waves using the obtained second visual effect, generate at least one of second high frequency information or second low frequency information based on the second audio recording, and at least one of:

rotate the generated images of the sinusoidal waves using the second low frequency information when the second low frequency information is generated, or magnify the generated images of the sinusoidal waves using the second high frequency information when the second high frequency information is generated.

14. The device as in claim 10, where the processor is to:

retrieve an image from the database, and modify the retrieved image based on the frequency information, where, when modifying the retrieved image, the processor is to at least one of:

rotate the retrieved image using the low frequency information, or magnify the retrieved image using the high frequency information.

15. The device as in claim 10, where the database includes:

a visual effect for swirling an image.

16. A device comprising:

means for retrieving a ring tone, an image, and a visual effect from a database based on a client line identifier (CLI);

means for generating frequency samples from the ring tone, the generated frequency samples including at least one of high frequency samples and low frequency samples;

means for generating an image using the frequency samples and the visual effect, where the means for generating the image includes at least one of:

means for rotating the retrieved image using the low frequency samples to generate the image when the generated frequency samples include the low frequency samples, or means for magnifying the retrieved image using the high frequency samples to generate the image when the generated frequency samples include the high frequency samples; and means for displaying the generated image on a display screen.

17. The device as in claim 16, where the database includes:

a visual effect for swirling an image.

18. The device as in claim 16, further comprising:

means for associating, in the database, the visual effect, the image, or the ring tone with the CLI.

19. The device as in claim 16, further comprising:

means for receiving a call; and means for determining a CLI based on the call.

20. A method comprising:

receiving a call;

identifying a ring tone, an image, and a visual effect based on the received call;

playing the identified ring tone to announce the received call;

generating, based on the identified ring tone, frequency information that includes first frequency information and second frequency information;

displaying the identified image while the identified ring tone is playing;

modifying the identified image, using the identified visual effect and the generated frequency information, based on the playing of the ring tone, where modifying the identified image includes:

rotating the identified image using the second frequency information, and magnifying the identified image using the first frequency information; and displaying the modified image.

21. The method as in claim 20, further comprise:

producing a client line identifier (CLI) based on the call, where the identifying includes:

identifying the ring tone, the image, and the visual effect based on the produced CLI.

* * * * *